(12) United States Patent
Hall

(10) Patent No.: US 6,411,435 B1
(45) Date of Patent: Jun. 25, 2002

(54) MONOCULAR VIEWER AND RECORDER

(76) Inventor: John M. Hall, 1504 Dare Ct., Alexandria, VA (US) 22308

( * ) Notice: Subject to any disclaimer, the term of this patent is extended or adjusted under 35 U.S.C. 154(b) by 0 days.

(21) Appl. No.: 09/573,210

(22) Filed: May 19, 2000

(51) Int. Cl.[7] ............................ G03B 13/06; F21V 9/04; A61B 1/00
(52) U.S. Cl. ...................... 359/435; 359/359; 359/362; 359/367
(58) Field of Search ................................. 359/362–363, 359/367, 399–406, 434–435, 503–506, 744; 250/214 VT, 334; 385/116

(56) References Cited

U.S. PATENT DOCUMENTS

| | | | | |
|---|---|---|---|---|
| 3,803,407 A | * | 4/1974 | Anderson | 359/359 |
| 4,375,913 A | * | 3/1983 | Hajnal | 359/362 |
| 5,305,142 A | * | 4/1994 | Phillips et al. | 359/435 |
| 5,448,671 A | * | 9/1995 | Wimmer et al. | 385/116 |
| 5,479,016 A | * | 12/1995 | Curry et al. | 250/334 |
| 5,909,309 A | * | 6/1999 | Di Taranto et al. | 359/362 |

* cited by examiner

Primary Examiner—Thong Nguyen
(74) Attorney, Agent, or Firm—Milton W. Lee; John E. Holford

(57) ABSTRACT

A refocusing device for an optical image display consisting of back-to-back optical eyepieces and other optical elements that creates at least one additional displaced optical image and permits reverse viewing through optical imaging systems.

11 Claims, 1 Drawing Sheet

MONOCULAR VIEWER AND RECORDER

BACKGROUND OF THE INVENTION

1. Field of the Invention

The invention relates to optical systems designed only for direct viewing by the eye of an observer. This includes passive devices like telescopes, microscopes and the like. It also includes active devices like infrared viewers, wherein a weak IR image is converted to a strong visible image by combinations of image intensifiers, photocathodes, photodiodes, cathode ray tubes, light emitting diodes (LEDs), etc. In particular it pertains to wide-angle viewers such as the peephole viewers found in residential front doors.

2. Description of Prior Art

Most IR imaging systems include displays featuring miniature image sources viewed through eyepieces. These eyepieces are designed with only a small amount of eye relief, so that, when it is desired to mount a monitoring device like a video camera using an image splitter, there is no longer room for the human eye. The Army's Night Vision Laboratory recently obtained a commercially available device to mount such a camera, but it seriously degraded the field of view and has therefore not been satisfactory. The Laboratory at the same time has received requests from law enforcement agencies for a related optical device that can be placed over a peephole lens found in many residential doors. The device would obscure the view from inside, while providing a wide view of the interior from the outside. The present invention addresses both of these problems.

SUMMARY OF THE INVENTION

A peepscope for an imaging device, the peepscope's lenses being housed in a common tube centered on a main optical axis coaxial with the optical axis of the imager. The lenses consisting of first and second eyepieces with their objective lenses facing each other, thereby providing identical input and output common tube ends. The tube may further include an optional framed side window centered on a secondary optical axis that intersects the main axis at a reflection point adjacent to and defining the tube's input end. The viewer may also include an optional beam-splitter centered on the main optical axis at the reflection point forming an image through the side window, to accommodate a camera supported by the window's frame. The peepscope may also include an optional central optical processor centered between the objective lenses, which can intensify and/or invert an input image formed by the eyepiece nearest the reflection point. Finally, the input and output ends of the common housing tube may be fitted with eyecups or similar adapters to bridge the gaps between the observer and the imager.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
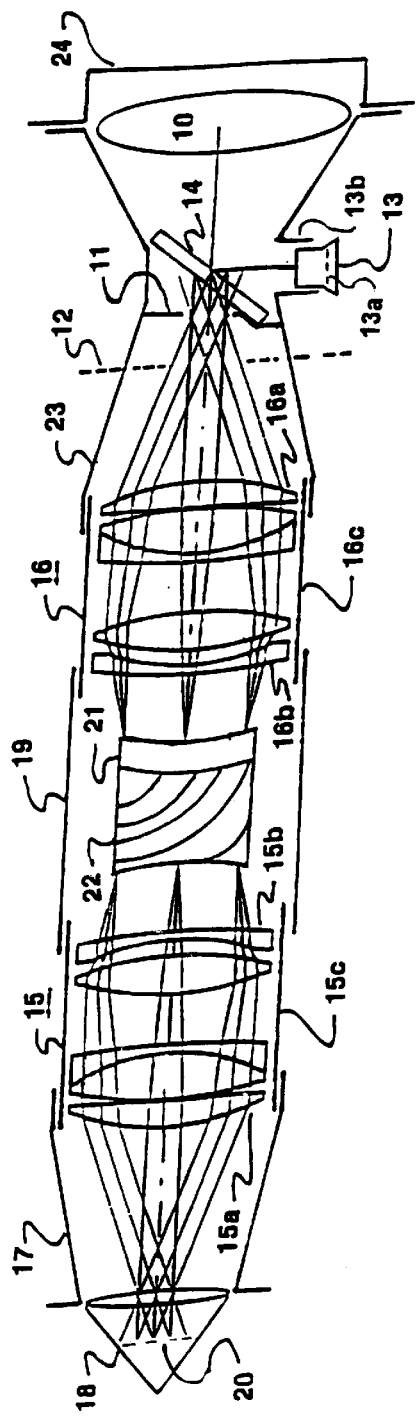
FIG. 1 is a side view of a special peepscope according to the invention, that provides second and third focal planes conveniently spaced from the first original focal plane of an imager.

Referring to FIG. 1, the final lens element 10 of an existing imager is considered a source of collimated light bundles, which defines a first aperture stop or external exit pupil at location 11. This aperture or iris conforms to the size of an iris pupil in a human eye and an image is formed at a first focal plane 12, centered on the optical axis of the imager, corresponding to the retina of that eye. One object of this invention is to recreate this image by means of a special peepscope, having a main optical axis coaxial with the imager, at a second focal plane for this same eye. Another object is to partially redirect a portion of the light onto a third focal plane, such as the detector array 13a of a camera 13. To do this a beam-splitter 14 is centered on the main optical axis at the input end of the special peepscope and must be placed ahead of the first focal plane, in the same area as the first aperture. The camera is centered on a secondary optical axis defined by the center axis of a tubular window frame 13b in the housing tube and the center of the beam-splitter. The camera may also use the window frame as a support means and is assumed to have its own integral optics designed for focusing collimated light. To provide the second focal plane for the above-mentioned eye, a normal eyepiece assembly 15 is mounted in the peepscope on the main optical axis of the peepscope and imager, whereby its imaging focal point defines the center of the second focal plane. This assembly, which may for example be an eyepiece from the Army's AN/AV3-6 goggles, normally includes a set of imaging lens elements 15a and a set of objective lens elements 15b mounted in an output housing tube 15c. Light transmitted through the beam-splitter from image in the first focal plane, however, is first captured and collimated by a reverse-eyepiece assembly 16 also having an optical axis coaxial with the optical axis of the imager with its focal point centered in the first focal plane. This assembly may include a set of imaging lens elements 16a and a set of objective lens elements 16b mounted in an input housing tube 16c substantially equivalent to those in the normal eyepiece assembly. The normal and reversed eyepieces do not have to be identical, but they should both produce substantially the same image quality and can be simpler than those specified above. The ends of the tubes may be smooth or threaded to engage connecting adaptors, image intensifiers or an IR imager. However, bayonet or snap couplings also can be used, if desired. The output end of of the peepscope may be free or carry a rubber eyecup 17 that presses on the eye socket around the user's eye 18. Preferably, the eyecup normally slides tightly over the inside or outside of the output housing tube. The reversed eyepiece is mounted between the input end of the peepscope and the normal eyepiece assembly on the same optical axis as the latter, but reversed so that the objective sets 15b and 16b are adjacent one another. The objective ends of the tubes can joined by a first adapter ring 19 that threads into or slides over them. The reverse-eyepiece optical assembly is fundamentally a standard eyepiece being used as an objective lens, but with the desirable property of being designed for interface with an external pupil position.

The reverse-eyepiece collimates light onto a central plane normal to the main axis that may be imaginary or defined by the input surface of a central optical processor. The structure and purpose of such a processor will be discussed presently. The normal eyepiece 15 then collects the collimated light from the above imaginary central plane or the output surface of the central optical processor, if present. The normal eyepiece de-collimates the processed image and projects another pupil position at its focal point centered in the second focal plane 20, which is much more accessible to a viewer's eye 18. The length of the first adapter 19 must, of course be increased to accommodate the axial dimension of the central processor, when present.

The central processor may include an image intensifier tube 21, such as a wafer type tube, and/or a bundle of fiber optics 22 twisted 180° to act as an image inverter. The intensifier tube is best used when the level of the display is too low to view comfortably. This may occur due to lack of radiance from the scene or a marginal luminance of the imager. In the present assembly the use of a beam-splitter can greatly reduce the luminance to the eye, a condition that may worsen if the camera requires more luminance than the eye. The fiber optic inverter is used, if the image presented to the eye is inverted. The orientation in the image presented to the camera is not critical, but visual interpretation requires a normal orientation. Both the intensifier and the inverter preserve the integrity of the image as it passes from the front to back surface of each. Some image intensifiers are designed to both invert and intensify, which may make the fiber optic inverter unnecessary. The image intensifier and/or the fiber optic inverter may be cemented or otherwise attached to the first adapter coupling 19 forming a single element for easy and precise assembly. The intensifier requires a power source and wiring, not shown, either inside or outside of the tube, which conceivably may be an integral part of the intensifier. Likewise the image-splitter may be cemented to a second housing adapter 23 as by slightly reshaping the iris 11. For permanence the tubes for the two eyepieces and the above first and second adapters may be formed as a unitary common housing of greater integrity and accuracy.

When no camera is required, the first reversed eyepiece could use a rubber eyecup to bridge the gap between it and the imager housing wall 24 that supports the imager's final lens element 10. However, a rigid second adapter 23, is generally preferred. This may be frictionally attached or screwed to the reverse eyepiece tube 16 and attached by threads, screws or the like to the housing wall 24. This adapter provides a means to maintain alignment of the tube and optical axes and the spacing of the lens elements from the first focal plane. This adapter should also provide accurately spaced mounting surfaces for the beam splitter and the video camera. Since the threads or other engagement area is only formed on the inside or the outside of both ends of each tube, all the ends may be similarly formed to simplify assembly. The second image, at the second focal plane 20, occurs several inches beyond the first image and is shown formed in the observer's eye 18.

The eyepiece tubes 15 and 16, the first adapter 19, eyecups 17 and/or the second adapter 23 when assembled provide a common housing tube for the viewer. When only the eyepieces and fiber optic twist are used, either end may be the input or output end of this housing. However, when using the second adaptor, the beam-splitter or the image intensifier 21, the inputs of those elements obviously define the input and output ends of this housing.

Figure 2:
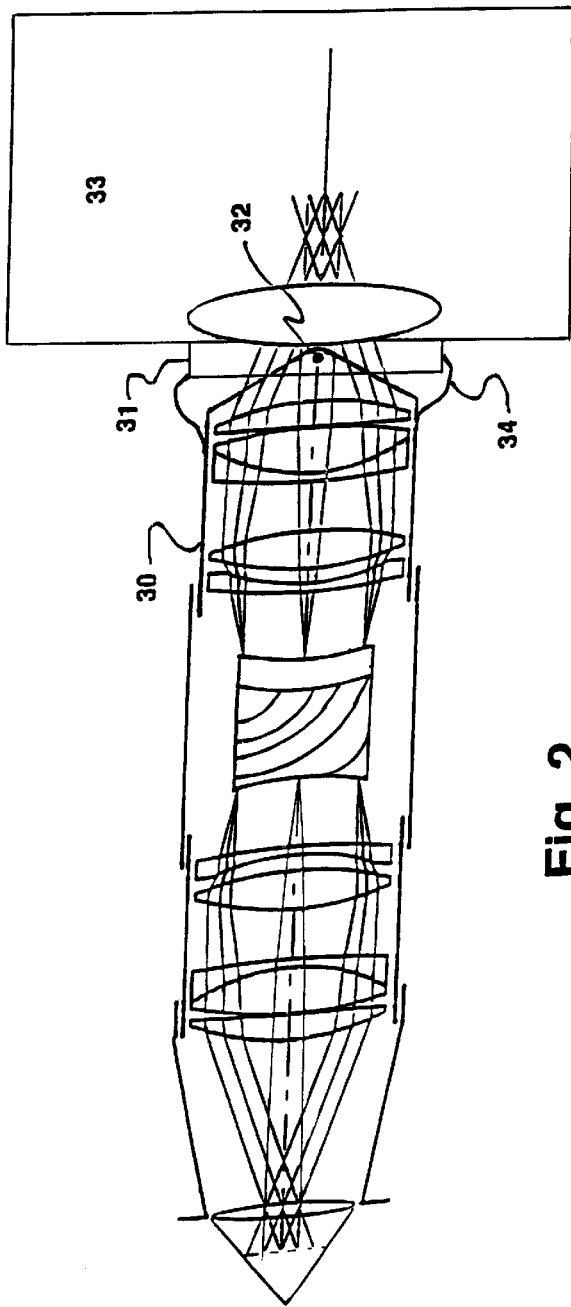
FIG. 2 is a side view of a special peepscope, similar to that in FIG. 1, which together with the optic elements in an outside door peephole provides a wide outside view into the interior of a home or business.

FIG. 2 shows a system similar to FIG. 1 wherein the monocular imaging system is a peephole viewer as found in a great many residential front doors, such as single dwellings, apartments, businesses and sometimes storage areas. These viewers present a great danger to law enforcement officials performing forced entries. They can be used to aim weapons through the door and to plan tactics employed after the break-in. These viewers have adopted a fairly standard configuration of optics in order to achieve the widest possible field of view from the very small aperture employed. In this arrangement an eyecup, like eyecup 17, serves well as a replacement for the second adapter 23. The eyecup can be pressed against the peephole and the peepscope rotated about a vertical or horizontal axis through the eyecup, as near the door as possible, to provide an extended field of view. Alternatively the second adapter may use a section of discontinuous rigid tubing divided into two portions 30 and 31 connected by vertical hinge pins 32 normal to the optical axis. The adapter portion 31 touching the door 33 remains fixed while the rest of the adapter 30 is slewed to cover an extended field of view. The hinged portion may be bridged with cloth sleeve 34 or accordioned plastic to shut out all light external to the dwelling, when the user's eye meets the eyecup on the normal eyepiece. Elements 30, 31, 32 and 34 thus become part of the common housing tube, when used.

While this invention has been described in terms of preferred embodiments consisting of two eyepieces designed for use in U.S. Army goggles, those skilled in the art will recognize that many other eyepieces can be used with modification within the art will recognize that many other eyepieces can be used with modification within the spirit and scope of the appended claims.

Having thus described my invention, what I claim as new and desire to secure by Letters Patent is as follows:

1. A peep-scope for refocusing a first visible light image, projected from inside the housing of an optical imager and focused through an iris centered on the basic optical axis of said imager onto a first focal plane, so as to form a second visible image in at least a second focal plane further from the imager than said first focal plane: said peep-scope comprising:

a common housing tube with a central longitudinal optical axis that intersects and defines an extension of said basic optical axis;

two eyepieces, said eyepieces each having spaced objective and imaging lens sets mounted in said common housing tube on said longitudinal optical axis, said imaging sets being spaced from the center of said tube near the opposite ends of said tube with said objective sets being located near the center of said tube;

a tubular input adapter means mounted at one end of said tube to define said one end as an input end and to engage said tube and imager housing and to maintain alignment of said longitudinal axis with said light image as well as the spacing of said common housing tube from said imager such that the input focal plane of the eyepiece nearest said input end lies in said adapter means at said first focal plane; and an eyecup mounted at the opposite output end of said tube to define said opposite end as an output end and to engage the eye socket of a human user thereby placing the output focal plane of the eyepiece at said output end on the retina of the user's eye which represents said second focal plane.

2. A peep-scope according to claim 1; wherein:

said input adapter means forms an extension of the wall of said tube with a side window frame in said extension between said input focal plane and said imager; and a beam-splitter is mounted in said input adapter means centered on said longitudinal axis between said input focal plane and said imager, said splitter being oriented to reflect a third image through said window frame to a third focal plane outside said tube centered normally on a secondary optical axis that intersects said longitudinal axis.

3. A peep-scope according to claim 2; wherein:

said window frame serves as a mounting means to support a camera with its focal plane in said third focal plane.

4. A peep-scope according to claim 3; further including:

a central processor means mounted in the center of said tube to increase the luminance of said second image.

5. A peep-scope according to claim 4; wherein said central processor includes:

a bundle of fiber optics twisted 180° about the optical axis mounted in the center of said tube to invert the image therein.

6. A peep-scope according to claim 5; wherein said central processor further includes:

a wafer type image intensifier tube to increase the luminance of the image therein.

7. A peep-scope according to claim 4; wherein said central processor includes:

a wafer type image intensifier tube means to increase the luminance of the image therein.

8. A peep-scope according to claim 4, wherein said central processor includes:

an image intensifier tube means with an internal image inverter to increase the luminance and invert the orientation of the image therein.

9. A peep-scope according to claim 1; wherein said tube includes:

two tubular housings, one for each of said eyepieces, joined by a central tubular adapter means to align the optical axes of said eyepieces.

10. A peep-scope according to claim 9; wherein:

said input adapter means forms an extension of the wall of said tube with a side window frame in said extension near said one end; and a beam-splitter is mounted in said input adapter means centered on said longitudinal axis between said first focal plane and said imager to reflect a third image through said side window frame to a third focal plane outside said tube on a secondary optical axis that intersects said longitudinal axis.

11. A peep-scope according to claim 9, wherein said input adapter means includes:

a window frame means attached to said tube to support a video camera with its focal plane centered in said third focal plane.

* * * * *